Oct. 29, 1957 — M. C. HUTTO, JR. — 2,811,056
ADJUSTABLE CUTTER TOOL
Filed Aug. 15, 1955
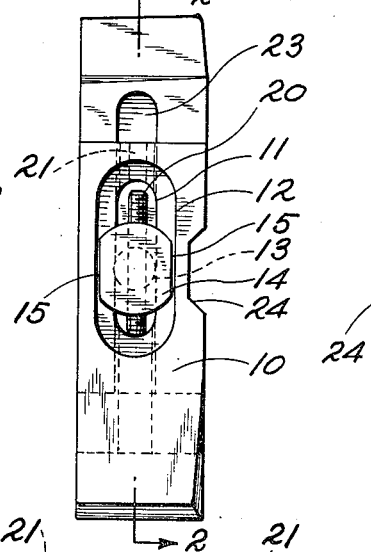
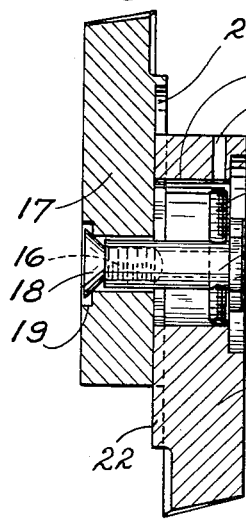
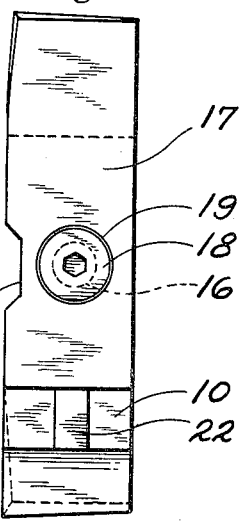
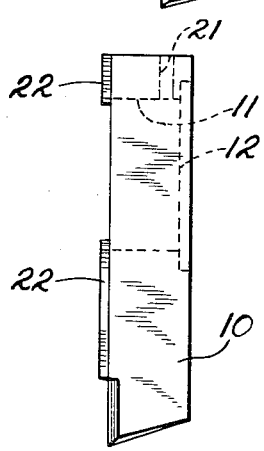
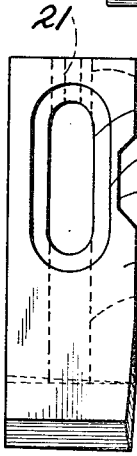
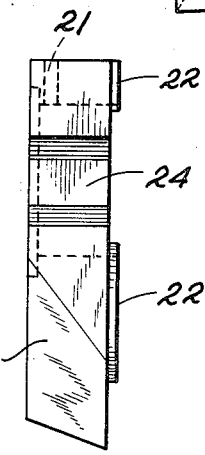
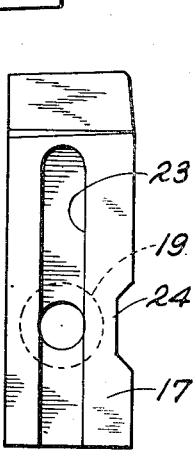
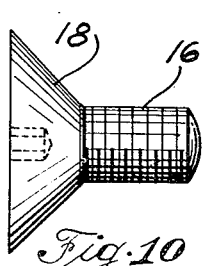
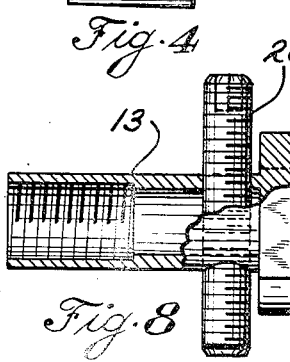
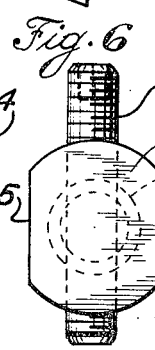
INVENTOR.
MARSDEN C. HUTTO, JR.
BY RICHEY, WATTS, EDGERTON & McNENNY
ATTORNEYS

United States Patent Office 2,811,056
Patented Oct. 29, 1957

2,811,056

ADJUSTABLE CUTTER TOOL

Marsden C. Hutto, Jr., Cleveland, Ohio

Application August 15, 1955, Serial No. 528,168

2 Claims. (Cl. 77—58)

This invention relates broadly to boring bar cutters and more specifically to improvements in boring and reaming tools of the type that embody a pair of interlocked parallel blades organized for lineal adjustment relative to each other.

The object of the invention is to provide an adjusting screw within the body of one of the cutters in order to eliminate the deleterious effects of the chips or steel shavings that impinge the out bored adjusting screw, heretofore in use, thus destroying the utility of the tool.

Further objects of the invention reside in the provision of a cutter blade assembly which is economic of manufacture, sturdy of structure and susceptible of adjustment with ease and dispatch.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 1 is a plan view of the improved cutter blade assembly;

Fig. 2 is a longitudinal sectional view thereof the section being taken on a plane indicated by the line 2—2 in Fig. 1;

Fig. 3 is a plan view of the bottom of the assembly shown in Fig. 1;

Fig. 4 is a plan view of the upper cutting blade;

Figs. 5 and 6 are side elevational views thereof;

Fig. 7 is a plan view of the lower cutter blade;

Fig. 8 is a detail view, shown on an enlarged scale of the binding post assembly, portions thereof being broken away and shown in section, in the interest of clarity.

Fig. 9 is an end elevational view thereof and;

Fig. 10 is a side elevational view of the clamping screw.

The boring or reaming tool contemplated herein comprises a pair of cutter blades of a requisite length to protrude slightly beyond the slot in the boring bar within which the cutters are mounted. As illustrated, the upper blade 10 is formed with an elongated axial slot 11 and a counterbored recess 12 end milled in the outer face thereof for the reception of a binding post 13. The post is formed with a head 14 seated in the counterbore flush with the top of the top of the blade, and with flat lands 15 thereon engaged with opposed side walls of the counterbore to restrain rotational movement of the post. The opposed end of the post is axially drilled and tapped for the reception of a cap screw 16, protruding through an opening in the lower blade 17, with the head 18 thereof seated in a counterbore 19 in the blade. The body of the post is cross-drilled and tapped adjacent the head 14 for the reception of a headless screw 20 slightly shorter than the slot 11 in the blade. The screw is provided with an axial recess in one end thereof forced to receive a pin wrench of hexagonal cross section. The body of the blade 10 is drilled with an opening 21 therein, disposed in coaxial alignment with the screw 20, to accommodate adjustments thereof.

The contiguous faces of the upper and lower blades 10 and 17 are formed respectively with an integral tongue 22 and a mating groove 23 interengaged to preserve alignment of the cutter blades. The outer ends of the blades are ground in the usual manner to provide the requisite rake and clearance for the character of work to be machined. One side wall of each blade is milled with a tapered notch 24 therein which is engaged by a set screw in the boring bar to effect the floating centrifugal adjustment of the cutting tool assembly.

When it is desired to resharpen the cutting edges of the blade, the cap screw 16 is loosened slightly, then the screw 20 is adjusted until the outer end thereof engages the contiguous end wall of the slot 11 and effects relative lineal movement of the blades, thereafter, the screw 16 may be retightened and the cutting edges circle ground. If desired, the cutters may be disassembled, the blades ground, then reassembled and adjusted to the proper dimension by manipulation of the screw 20.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A cutting tool for use in a boring bar comprising a pair of flat prismoidal blades disposed in parallel overlapped relation with each other, an integral axial key in one of said blades, the second blade having a mating axial key seat therein engaged with said key, the first named blade having a slot therein and a counterbore of similar configuration in the outer face thereof, a binding post in said slot, a head thereon, flat lands on said head engaged with the opposed side walls of said counterbore, said binding post having a threaded axial bore in the end opposite the head, a screw in the second named blade engaged in said axial bore in the binding post, said binding post having a threaded cross bore therein adjacent said head, a headless screw engaged in said cross bore, said headless screw having a wrench socket in one end thereof, each end of the headless screw engaging the end walls of said slot, the first named blade having an opening therein disposed in coaxial alignment with the wrench socket in said headless screw, said opening being of a smaller diameter than the body of said screw.

2. A cutting tool for use in a boring bar comprising a pair of flat rectangular blades arranged in inter-keyed parallel relation with each other, one of said blades having a slot therein and a counterbore in the outer face thereof, a binding post in said slot, a head thereon keyed for lineal movement in said counterbore, a screw in the second blade engaged in a threaded axial bore in said binding post, a headless transaxial screw in said binding post having a wrench socket in one end thereof, the ends of said screw engaging the end walls of said socket, the first named blade having an opening therein for access to the wrench socket in said headless screw.

References Cited in the file of this patent

UNITED STATES PATENTS

| 335,206 | Birkenhead | Feb. 2, 1886 |

FOREIGN PATENTS

| 843,199 | Germany | July 7, 1952 |
| 885,335 | Germany | Aug. 3, 1953 |